(12) United States Patent
Dister et al.

(10) Patent No.: US 6,289,735 B1
(45) Date of Patent: *Sep. 18, 2001

(54) MACHINE DIAGNOSTIC SYSTEM AND METHOD FOR VIBRATION ANALYSIS

(75) Inventors: Carl J. Dister, North Olmsted; Frederick M. Discenzo, Brecksville; Kenneth A. Loparo, Chesterland, all of OH (US)

(73) Assignee: Reliance Electric Technologies, LLC, Thousand Oaks, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,933

(22) Filed: Sep. 29, 1998

(51) Int. Cl.[7] .................................................. G01H 9/00
(52) U.S. Cl. .............................. 73/579; 73/659; 73/660
(58) Field of Search .............................. 73/660, 559, 579, 73/593; 364/431.08, 505, 551.02; 702/35, 39, 56

(56) References Cited

U.S. PATENT DOCUMENTS

| | | | |
|---|---|---|---|
| 4,380,172 | * | 4/1983 | Imam et al. ........................... 73/659 |
| 4,425,798 | * | 1/1984 | Nagai et al. ........................... 73/659 |
| 4,429,578 | * | 2/1984 | Darrel et al. ........................... 73/659 |
| 4,965,513 | | 10/1990 | Haynes et al. ................. 324/158 MG |
| 5,049,815 | | 9/1991 | Kliman ........................ 324/158 MG |
| 5,419,197 | * | 5/1995 | Ogi et al. ............................... 73/659 |
| 5,456,115 | * | 10/1995 | Kuwabara et al. ..................... 73/659 |
| 5,501,105 | * | 3/1996 | Hernandez et al. .................... 73/660 |
| 5,533,400 | * | 7/1996 | Gasch et al. ............................ 73/593 |
| 5,574,646 | * | 11/1996 | Kawasaki et al. ............. 364/431.08 |
| 5,602,757 | | 2/1997 | Haseley et al. ................. 364/551.01 |
| 5,610,339 | * | 3/1997 | Haseley et al. ........................ 73/660 |
| 5,614,676 | * | 3/1997 | Dutt et al. .............................. 73/660 |

OTHER PUBLICATIONS

"Comments on Rolling Element Bearing Analysis"; by Ronald L. Eshleman, et al.; Vibrations; vol. 13; No. 2; Jun. 1997; pp 11–17.

* cited by examiner

Primary Examiner—Richard A. Moller
(74) Attorney, Agent, or Firm—Himanshu S. Amin; A. M. Gerasimow

(57) ABSTRACT

A diagnostic system includes a vibration sensor mounted on a machine to measure vibrations. Vibration signals from the sensor are processed and analyzed by the system. From a known critical frequency of a vibration-generating component, the system measures the amplitude of the vibration signal at more than one harmonic frequency of the known critical frequency and compares the amplitudes to amplitudes at adjacent harmonic frequencies. When a relatively large amplitude is found at a harmonic frequency, that is a harmonic frequency near a resonant frequency of the physical path between the vibration sensor and the vibration-generating component, the system analyzes the shape and magnitude of the vibration signal around that harmonic frequency to evaluate the condition of the machine.

32 Claims, 6 Drawing Sheets

MACHINE DIAGNOSTIC SYSTEM AND METHOD FOR VIBRATION ANALYSIS

FIELD OF THE INVENTION

The invention described below generally relates to a system for diagnosing the health of a machine, and more particularly, to a system and method for analyzing vibration signatures to predict and to detect changes in the condition of a machine.

BACKGROUND OF THE INVENTION

Today's machines are relied upon to operate with minimal attention. Many industrial and commercial facilities operate hundreds or even thousands of machines concurrently, many of which are integrated in a large interdependent process or system. Although maintenance procedures are becoming increasingly efficient, at any time at least a small percentage of the machines are prone to failure.

For example, machines having moving parts, such as bearings, are subject to constant friction that result in wear. For example, numerous studies have shown that bearing failures are the number one cause of motor faults. Unfortunately, however, most wear sites are concealed in the machine's assembled state. In particular, bearing damage due to wear from inadequate lubrication, shock or lubricant contamination may not be immediately apparent absent gross damage and/or failure. Thus, it is difficult to monitor wear rates and to prevent excessive wear on internal components of a machine.

Vibration analysis is an established nonintrusive technique for measuring the health of mechanical components in rotating machines. Every rotating machine exhibits a characteristic vibration signature which varies with the design, manufacture, application and wear of each component. Vibration may be generated by machine bearings including, for example, the bearing mounting, balls and ball races, misalignment of gears, motors, or shafts, and imbalance of rotors, gears, impellars and fans. Analysis of a machine's vibration signature is valuable for reducing unscheduled down time, reducing downtime for repair, minimizing periodic disassembly of a machine for inspection and greatly reducing the probability of catastrophic and unexpected machine failure.

A machine's vibration signature is composed of the sum of the vibration signals produced by and/or transmitted through each component of the machine. The vibration signals produced by a component includes forcing frequencies that vary with the rotational speed of the machine. For example, the forcing frequencies for a bearing include those of the inner race, the outer race and the ball track, and can be calculated as a function of the rotational velocity, the ball diameter, the pitch diameter, the contact angle and the number of balls. The forcing frequencies are sometimes referred to as the critical frequencies. The health of a particular component can be analyzed by considering the shape and magnitude of the vibration signals at the critical frequency or at harmonics of the critical frequency.

In analyzing the signature of a particular machine, the vibration signal of a particular component can be compared to signals from identical machines and/or historical signals to determine differences between signals or changes over time that may indicate a problem. Unfortunately, although the critical frequencies are readily calculable, measurement errors and the combination of the vibration signals from the different components and other sources mean that the signal-to-noise ratio at the frequency of interest may not be sufficient to perform an accurate analysis.

Furthermore, between a vibration sensor and the source of vibration, such as the bearing mentioned above, there is a mechanical transmission path which transmits the vibration signals from the source, such as a bearing, to the sensor. Each machine also has natural or resonant frequencies which cause relatively large increases in the amplitude of vibration for a given force input. If the resonant frequency of the transmission path is known, the signals will be amplified by that resonant frequency.

Thus the problem identified above of poor signal-to-noise ratios at a critical frequency can be overcome by looking at a harmonic of the critical frequency near the resonant frequency of the relevant transmission path. Resonant frequencies are generally a function of mass, stiffness and damping of a structure, however, and every machine and every transmission path will have a different set of resonant frequencies. As a result, the particular resonant frequency of a given transmission path is difficult to calculate without empirical measurements.

A calibrated force hammer and a vibration sensor (such as an accelerometer) generally are used to find the resonant frequency. A calibrated force hammer with a force transducer is used to strike the machine and to excite the structure with an approximated impulse signal to determine the resonant frequencies.

Generally, the test is performed as follows. With the machine off, a relatively small hammer is used to strike a few blows to the machine. A force transducer in the hammer sends a signal containing impact data to a spectrum analyzer, and the vibration sensor mounted on the machine sends frequency response data to the spectrum analyzer. By hitting the structure of the machine near points of interest (such as near the bearing cage) the resonant frequency of the transmission path of the structure between the hammer blow and the vibration sensor may be approximated.

The transient response generated by the hammer blow is measured with the spectrum analyzer to calculate the resonant frequency for that transmission path. In a time domain plot, the response appears as a large spike in amplitude which dies down over time. In a frequency domain plot, the graph is relatively flat with a noticeably high amplitude at a particular frequency, the resonant frequency. One advantage of the impact test is that a range of frequencies are excited relatively equally, and the resonant frequency stands out clearly.

Although sufficiently accurate for some applications, this procedure is imprecise and often impractical. For example, although measurement of resonant frequencies may be performed in the factory before the machine is delivered to a customer, many circumstances may lead to a machine in the field with an unknown resonant frequency where striking the motor with a calibrated hammer is inconvenient or very difficult. Furthermore, the procedure includes reproducing several hammer blows in the same spot to produce an average response over time (to reduce noise), the hammer must necessarily strike an outer housing of the machine rather than at the location of the vibration source (such as a bearing) inside the housing, and the excitation frequencies generated by the hammer blow are dependent on the hardness of the hammer face. Thus if the proper hammer is not used, the resonant frequency is not excited and the test must be repeated with a hammer having a different face hardness.

SUMMARY OF THE INVENTION

The present invention reduces or eliminates the need for a calibrated hammer and includes a diagnostic system which scans the vibration signature of a machine (e.g., dynamoelectric machine) while the machine is running and provides a vibration signal for particular components with increased efficiency and high signal-to-noise ratio.

The system includes at least one vibration sensor mounted on the machine to sense vibrations. The system evaluates vibration signals from the vibration sensor by employing a diagnostic module which processes and analyzes the vibration signals.

From a known critical frequency of a vibration-generating component, the diagnostic module can scan a plurality of harmonic frequencies of the critical frequency, measure the amplitude of the vibration signal at each harmonic frequency, and compare the amplitudes to amplitudes at adjacent harmonic frequencies. The diagnostic module can identify a resonant frequency by scanning for a relatively large increase in amplitude of a particular harmonic frequency. This means that the harmonic frequency is near the resonant frequency of a transmission path between the vibration sensor and the vibration-generating component. The diagnostic system can then analyze the shape and magnitude of the vibration signal around that harmonic frequency to evaluate the health of the vibration-generating component.

According to one aspect of the invention a diagnostic system for a dynamoelectric machine includes at least one vibration sensor mounted on the machine to sense vibration. The system also includes a processor adapted to receive the vibration signal from the vibration sensor and generate a vibration signature in the frequency domain using established signal processing algorithms (e.g., filtering, FFT). The processor logic will then scan the vibration signature over a series of frequencies to identify a resonant frequency for a transmission path from a vibration source to the vibration sensor and to evaluate the vibration signature in the vicinity of the resonant frequency to determine an operating state of the machine.

Another aspect of the present invention relates to a method of analyzing a vibration signature of a dynamoelectric machine. In the method, the vibration signature is obtained from a vibration sensor connected to the machine. The vibration signature is processed by determining at least an approximate resonant frequency of a vibration transmission path from a vibration-generating component of the machine to the vibration sensor; and scanning a frequency region adjacent the approximate resonant frequency for harmonic frequencies of the vibration-generating component of the machine associated with a relatively large amplitude. A condition of the machine is determined from characteristics of the vibration signal at the harmonic frequency near a resonant frequency.

Still another aspect of the present invention relates to a dynamoelectric machine diagnostic system including at least one vibration sensor mounted on a dynamoelectric machine to sense a vibration signature; and a processor adapted to receive the vibration signature from the at least one vibration sensor, the processor scanning the vibration signature over a series of harmonic frequencies of a critical frequency to identify a resonant frequency for a transmission path from a vibration source to the vibration sensor and evaluating the vibration signature in the frequency region near the resonant frequency to facilitate determining an operating state of the machine.

Another aspect of the present invention relates to a dynamoelectric machine diagnostic system including means for sensing a vibration signature mounted on a dynamoelectric machine; and means for scanning the vibration signature over a series of frequencies to identify a resonant frequency.

Still yet another aspect of the present invention relates to a diagnostic system for a dynamoelectric machine. The system includes: at least one vibration sensor mounted on the machine to sense vibration; and a processor adapted to receive a vibration signal from the vibration sensor and generate a vibration signal, the processor scanning the vibration signature over a series of frequencies to identify a resonant frequency for a transmission path from a vibration source to the vibration sensor and to evaluate the vibration signature in the vicinity of the resonant frequency, the processor comparing the identified resonant frequency with an expected resonant frequency in determining an operating state of the machine.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

A system and a method of the present invention are described below with reference to the drawings, and initially to FIG. 1. The invention relates to a diagnostic system and method for obtaining and using machine data for machine diagnosis and failure prediction. In particular, the invention relates primarily to a machine diagnostic system and method for analyzing vibration data to determine the condition (e.g., health) of the machine. The invention includes a system and a method for analyzing vibration data while reducing or eliminating the need to mechanically ping the machine to determine a resonant frequency of the vibration path between a source of the vibration and a vibration sensor. In the following paragraphs, the invention is primarily described with respect to an alternating-current (AC) induction motor, however, the invention can be applied to most machines (e.g., motors, pumps, generators, gear boxes, etc.)

and/or systems that generate vibrations. Moreover, the present invention may be applied to internal combustion engines, transmissions, differentials, etc.

Figure 1A:
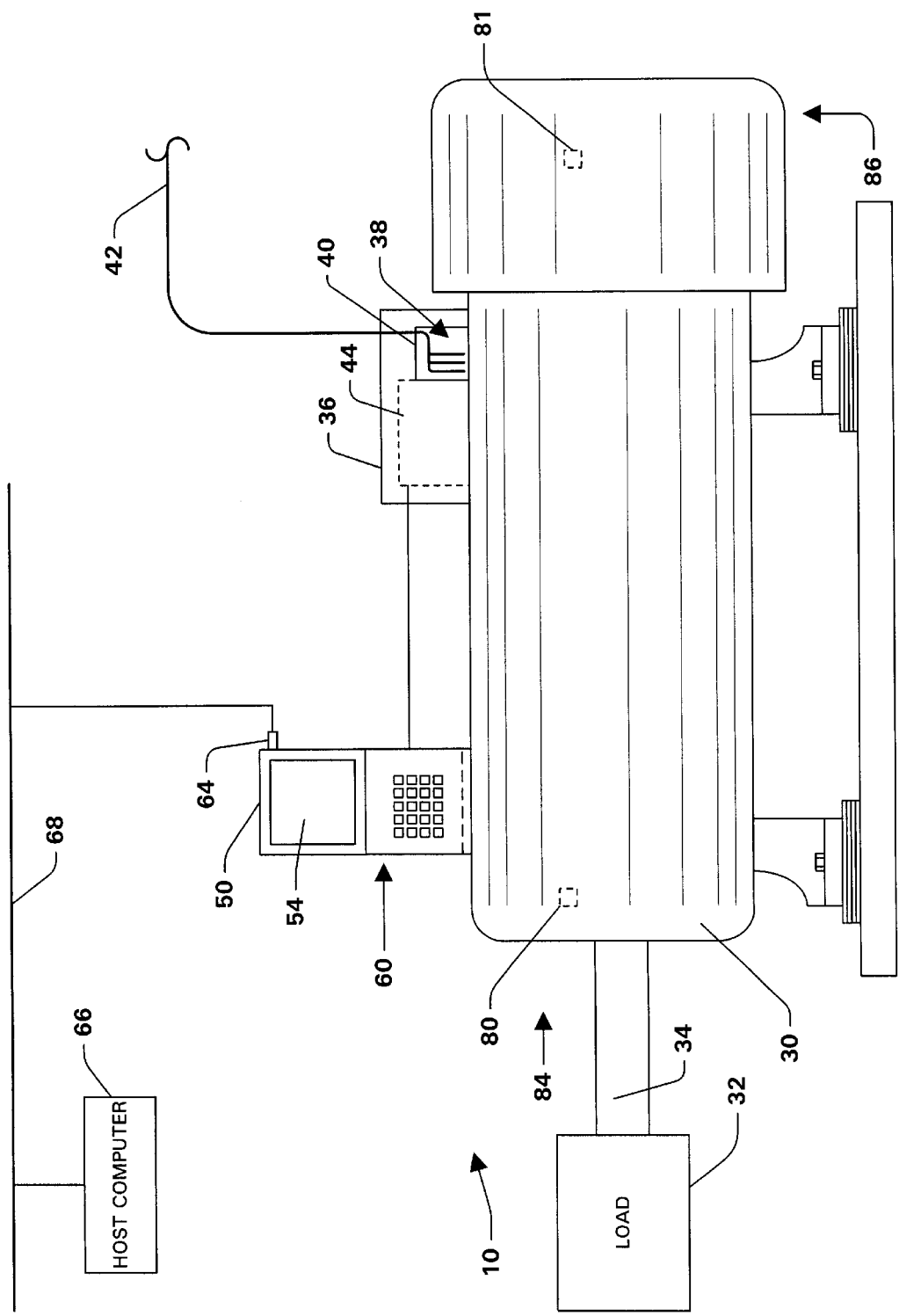
FIG. 1a is a schematic side view of an integrated AC induction motor, interface device and diagnostic module in accordance with one aspect of the invention.

An exemplary system 10 according to the invention is shown in FIG. 1a. A three-phase AC induction motor 30 is connected to a load 32 through shaft coupling 34. The motor 30 operates at an AC power line frequency of about 60 Hz, although different line frequencies, such as 50 Hz, may be used. The load 32 may be any device or article that drives or is driven by the motor 30 such as a turbine or a pump, for example.

The motor 30 has an enclosure such as a junction box 36 mounted thereon. The junction box 36 receives conductors 38 connected to a power source via conduit 42. The conductors 38 are connected within the junction box 36 to power supply mounts 40 of the motor 30. One of the functions of the junction box 36 is to protect the connections at the power supply mounts 40 and a diagnostic module 44 which receives and processes data from one or more vibration sensors (described below) relating to the health of the motor 30. Preferably the junction box 36 is suitably weatherproofed to protect the diagnostic module 44 from environmental conditions (e.g., dust, moisture, combustable gases, heat, etc.) experienced by the motor 30. For example, the junction box 36 may include thermal insulation to protect the diagnostic module 44 from heat generated by the motor 30.

The system 10 also includes an interface device 50 coupled to the motor diagnostic module 44. The interface device 50 includes a display 54 for displaying information relating to the operation of the motor 30. The display 54 may be a liquid crystal display (LCD), a cathode-ray-tube (CRT), one or more light emitting diodes (LEDs) or the like. The display 54 displays data or other information relating to the operation of the motor 30. For example, the display 54 may display a set of discrete motor condition indicia such as, for example, fault indicia, caution indicia, and normal operation indicia. Additionally, the display 54 may display a variety of functions that are executable by the motor 30 and/or the diagnostic module 44.

The interface device 50 further includes an input device in the form of a key pad 60, for example, for entering data, information, function commands, etc. in a conventional manner. For example, input information relating to motor status may be input via the key pad 60 for subsequent transmission to a host computer 66. The interface device 50 may use other known input devices including a mouse, a pointer, a touch pad, etc. Furthermore, the interface device 50 may be integrated with the motor diagnostic module 44 (See FIGS. 4a–4b and the related description below) and the diagnostic module 44 may carry out substantially all of the functions performed by the interface device 50 and/or the host computer 66. Alternatively, the interface device 50 may be located remotely from the motor 30. The interface device 50 also may be portable and alternately connectable to the diagnostic modules of a plurality of machines.

In the illustrated embodiment of the invention the system 10 also includes a network backbone 68. The network backbone 68 may be a hardwired data communication path made of twisted pair cable, shielded coaxial cable or fiber optic cable, for example, or may be wireless or partially wireless in nature. Information is transmitted over the network backbone 68 between the host computer 66, the interface device 50 and the diagnostic module 44. The interface device 50 includes a communications port 64 for interfacing the interface device 50 with the motor diagnostic module 44 and the host computer 66 through a suitable communication link. The communication link preferably adheres to the RS232C or DeviceNet standard for communicating command and parameter information. However, any communication link suitable for carrying out the invention may be employed. Although the invention is directed to vibration analysis, the diagnostic module 44 preferably is capable of analyzing other data, such as current data, voltage data and temperature data to diagnose the health of the motor 30, as described in copending and commonly owned U.S. patent application Ser. Nos. 08/988,177 and 09/073,505 the entireties of which are incorporated herein by reference.

At least one vibration sensor is mounted on the motor 30 to monitor its operation and to collect vibration data from the motor 30. Accelerometers are used as vibration sensors in the preferred embodiment, however, other types of vibration sensors may be used. For example, proximity detectors may be used as vibration sensors in large machines and/or systems. Since accelerometers sense vibration primarily in one direction, a plurality of accelerometers generally are necessary to detect the vibrations generated in different directions and in different parts of some equipment. Thus, in order to sense all significant vibration directions, multiple-axis sensors may be employed.

In the preferred embodiment, the motor 30 is equipped with at least one accelerometer, and more preferably two accelerometers 80 and 81 for taking sampled vibration data relating to the operation of the motor 30. As shown in FIG. 1a, a three-axis accelerometer 80 is located near a load side 84 of the motor 30, and a two-axis accelerometer 81 is located near a rear side 86 of the motor 30 away from the load side 84. However, the invention may be carried out with one, single-axis accelerometer. Preferably, the vibration sensors are laboratory-grade accelerometers such as those manufactured by PCB Piezoelectronics, Inc., (e.g., part No. 353B16) and providing 10 mv/g. However, any vibration sensor suitable for carrying out the invention may be employed. Accelerometers 80 and/or 81 may be mounted internal to the motor and affixed to the motor end bracket in close proximity to the motor bearings for improved performance.

The accelerometers 80 and 81 convert mechanical vibrations into analog electrical signals which are combined and delivered to the diagnostic module 44. As noted above, the accelerometers 80 and 81 are mounted to the motor 30 which requires access to the motor 30. In addition, the location and orientation of the accelerometers 80 and 81 is significant to the characteristics of the signal obtained. A vibration generated in one part of the motor 30 is transmitted through the solids separating the source from the accelerometer 80, 81. The transmission paths between the source of the vibrations and the accelerometers 80 and 81 affect the amplitude of the vibrations experienced by each accelerometer 80 and 81. Furthermore, analysis of the vibration signals based on comparisons of signals measured at different times is dependent on the ability to reproduce the precise location and direction of mounting of the accelerometers 80 and 81. Thus, the accelerometers 80 and 81 preferably are permanently mounted within the motor 30.

Additionally, it is to be appreciated that a plurality of vibration sensors may be suitably positioned around a single vibration generating component to enhance resolution/speed to establish resonant frequency.

One advantage of positioning the diagnostic module 44 within close proximity to the motor 30 is that the length of wire from the vibration sensors 80 and 81 to the diagnostic module 44 is minimized thereby minimizing the amount of ambient noise that may be introduced through the wires. Preferably, the diagnostic module 44 is positioned on the motor 30 such that the length of a respective sensor wire is less than three feet.

Figure 1B:
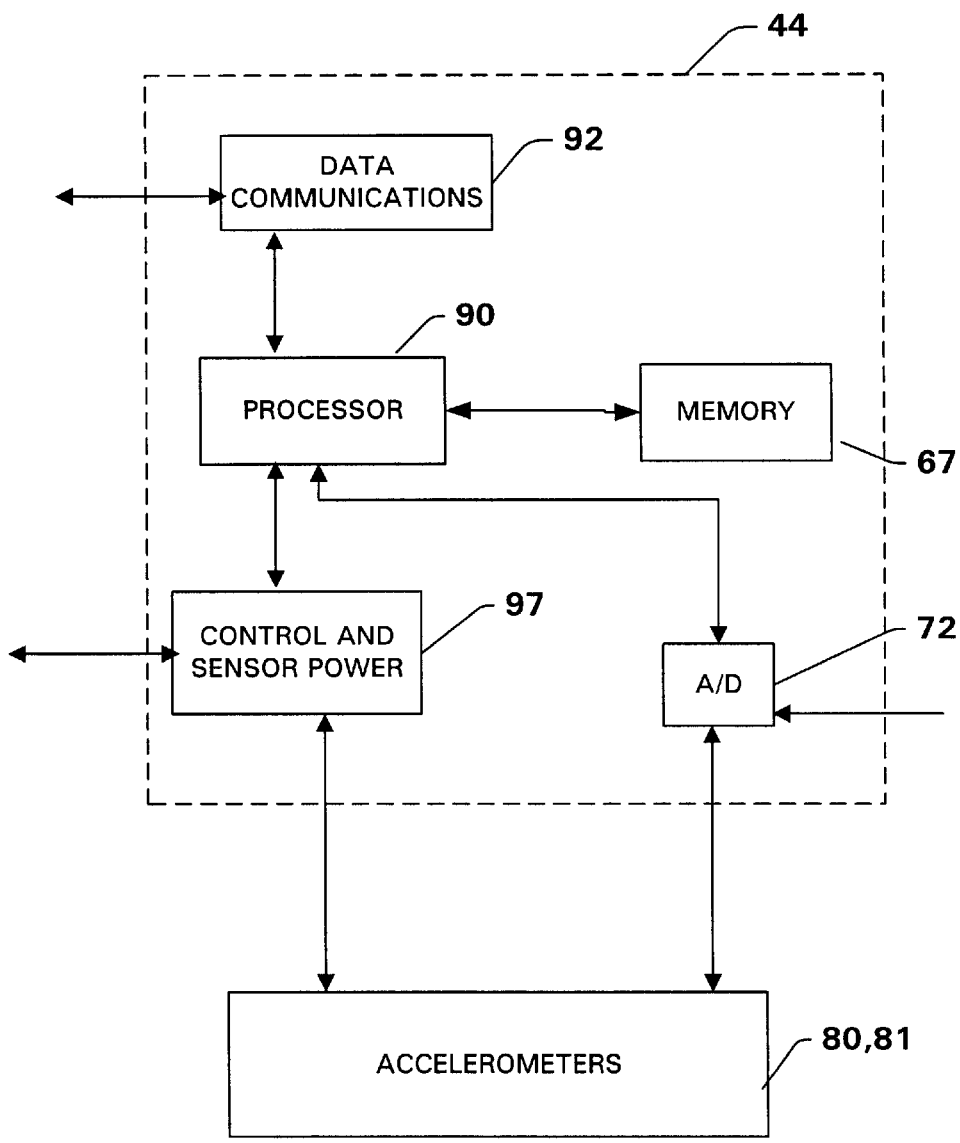
FIG. 1b is a functional schematic block diagram of a diagnostic in accordance with the present invention.

Turning now to FIG. 1b, a schematic block diagram of various components of the diagnostic module 44 is shown. The diagnostic module 44 includes an analog-to-digital (A/D) converter 72 for converting the analog signal from the accelerometers 80 and 81 to a digital signal representative of the vibrations in the motor 30. The A/D converter 72 sends the digital signals to a processor or CPU 90. The A/D 72 may include signal processing means (e.g., anit-aliasing filter) for suitably conditioning incoming signals. The processor 90 is responsible for controlling the general operation of the diagnostic module 44. The processor 90 is programmed to control and operate the various components within the diagnostics module 44 in order to carry out the various functions described herein. The processor 90 can be any of a plurality of suitable processors, such as the p24T, Pentium 50/75, Pentium 60/90, and Pentium 66/100, Pentium PRO and Pentium 2, Motorola MC68HC16Z1CFC16 and other similar and compatible processors. The manner in which the processor 90 can be programmed to carry out the functions relating to the present invention will be readily apparent to those having ordinary skill in the art based on the description provided herein and thus further discussion related thereto is omitted.

A memory 67 tied to the processor 90 also is included in the motor diagnostics module 44 and serves to store program code executed by the processor 90 for carrying out operating functions of the motor diagnostics module 44 as described herein. The memory 67 also serves as a storage medium for temporarily storing information such as vibration analysis data. The memory 67 also may include machine specific data (such as bearing critical frequencies and previously measured resonant frequencies of various vibration transmission paths) which is used to facilitate machine diagnosis.

The memory 67 includes read only memory (ROM) and random access memory (RAM). The ROM contains among other code the Basic Input-Output System (BIOS) which controls the basic hardware operations of the motor diagnostics module 44. The RAM is the main memory into which the operating system and application programs are loaded. The RAM may also store critical threshold values for motor diagnostics.

The memory may store design information relating to the motor 30 as well as information relating to critical frequencies of various vibrating components of interest within the motor 30. Furthermore, the memory may store historical vibration data (e.g., vibration signatures) relating to operating states of the motor 30. The processor 90 may access this information stored in the memory 67 to facilitate evaluating the vibration signature and determining an operating condition (e.g., health) of the motor 30.

Power is provided to the processor 90 and other components forming the diagnostic module 44 from a control and sensor power system 97. However, it will be appreciated that such power could be obtained from the motor power leads 38 themselves through power converting circuitry (not shown).

The diagnostics module 44 also includes a data communication system 92 which includes a data communication port and communications card (not shown), that are employed to interface the processor 90 with the interface device 50 and/or the host computer 66 via the network backbone 68. The communication system 92 preferably adheres to the RS232C or DeviceNet standard for communicating command and parameter information. However, any communication system suitable for carrying out the invention may be employed.

Note that the invention may be used in a system which does not include an interface device 50 and host computer 66. All processing including data analyses and motor condition estimation and health determination could be accomplished by the processor 90 and the results transmitted to a PC or a control computer such as a programmable logic controller (PLC) (not shown) or stored in memory 67 for trending or transmitting at a later time. Furthermore, only one data link may be required.

According to another embodiment, the processor 90 could be employed to simply trigger a single bit digital output which may be used to open a relay and turn the motor 30 off.

The processor 90 controls the signal sampling and digitizing rate as well as any buffering of the digitized signals of the vibration data that might be needed. The data collection rate is carried out, for example, at 26,203 samples per second over a period of 8 seconds. This data collection rate provides sufficient data upon which the processor 90 can generate a comprehensive frequency spectrum of the motor vibration signal suitable for analysis.

Figure 2:
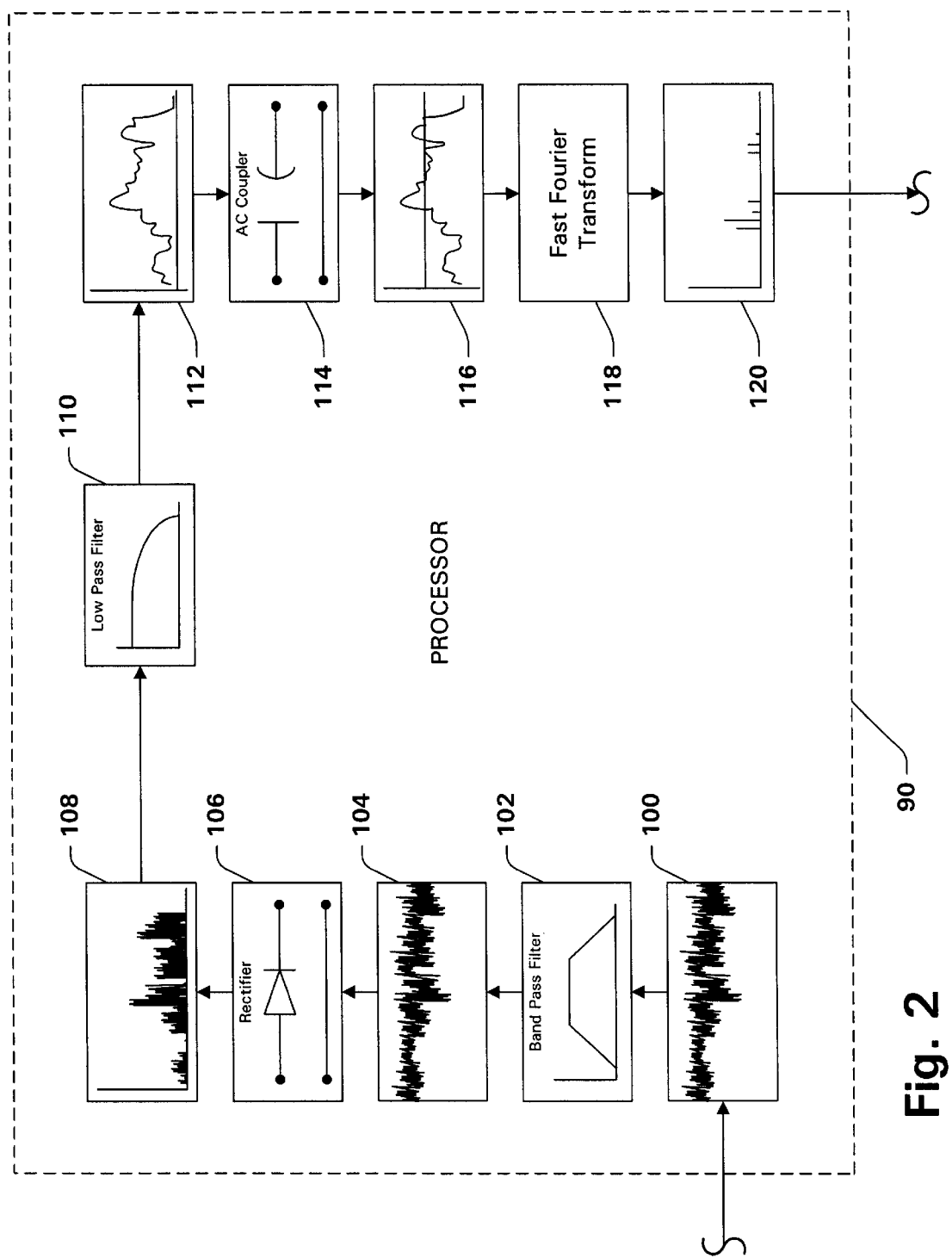
FIG. 2 is a functional block diagram illustrating the processing of vibration data by a processor of the diagnostic module in accordance with the present invention.

As described above, the accelerometers 80 and 81 generate analog vibration data which is converted into a digital vibration signal by the A/D converter 72 which provides the digital vibration data to the processor 90. Referring hereafter also to FIG. 2, a functional block diagram represents the processing of vibration data by the processor 90 of the motor diagnostics module 44.

The processing performed on the vibration data by the processor 90 includes a process referred to as demodulation. One demodulation technique, sometimes referred to as enveloping, is performed by the processor 90 to synthesize the digital vibration data 100 into a form usable for failure analysis. The digital vibration data 100 enters the processor 90 and passes through a band pass filter 102 which removes frequencies outside the scope of interest and within the dynamic range of the processor 90 to form a filtered signal 104. The filtered signal 104 passes through a rectifier 106, for example a diode, which forms a rectified signal 108. The rectified signal 108 passes through a low pass filter 110 which removes the high frequencies to form a relatively low frequency signal 112. The low frequency signal 112 is passed through a capacitor 114 to produce a demodulated signal 116. A fast fourier transform (FFT) is performed on the demodulated signal 116 by FFT operator 118 to produce a vibration spectrum 120. The FFT operator 118 includes commercially available fast fourier transform software such as MATLAB by The Math Works. The FFTs of the vibration signal data are discretized over N number of points to facilitate processing. In the preferred embodiment, N=2,048, however, it will be appreciated that the FFTs of each signal may be discretized over any suitable number of points. The vibration spectrum 120 can be analyzed by the host computer 66 to determine the health of the motor 30.

Although the invention has been described with respect to obtaining FFTs of the vibration signals, other suitable techniques may be employed. For example, wavelet transforms may be taken of the sensor data. One advantage to using the wavelet transform is that the total size of the transform is a compact representation of the original signal and will require considerably less storage space than the original signal.

It is to be appreciated that prior to analyzing the vibration FFTs, it is desirable to know the motor speed in order to suitably interpret the FFT and detect defects and isolate particular bearing faults.

Figure 3:
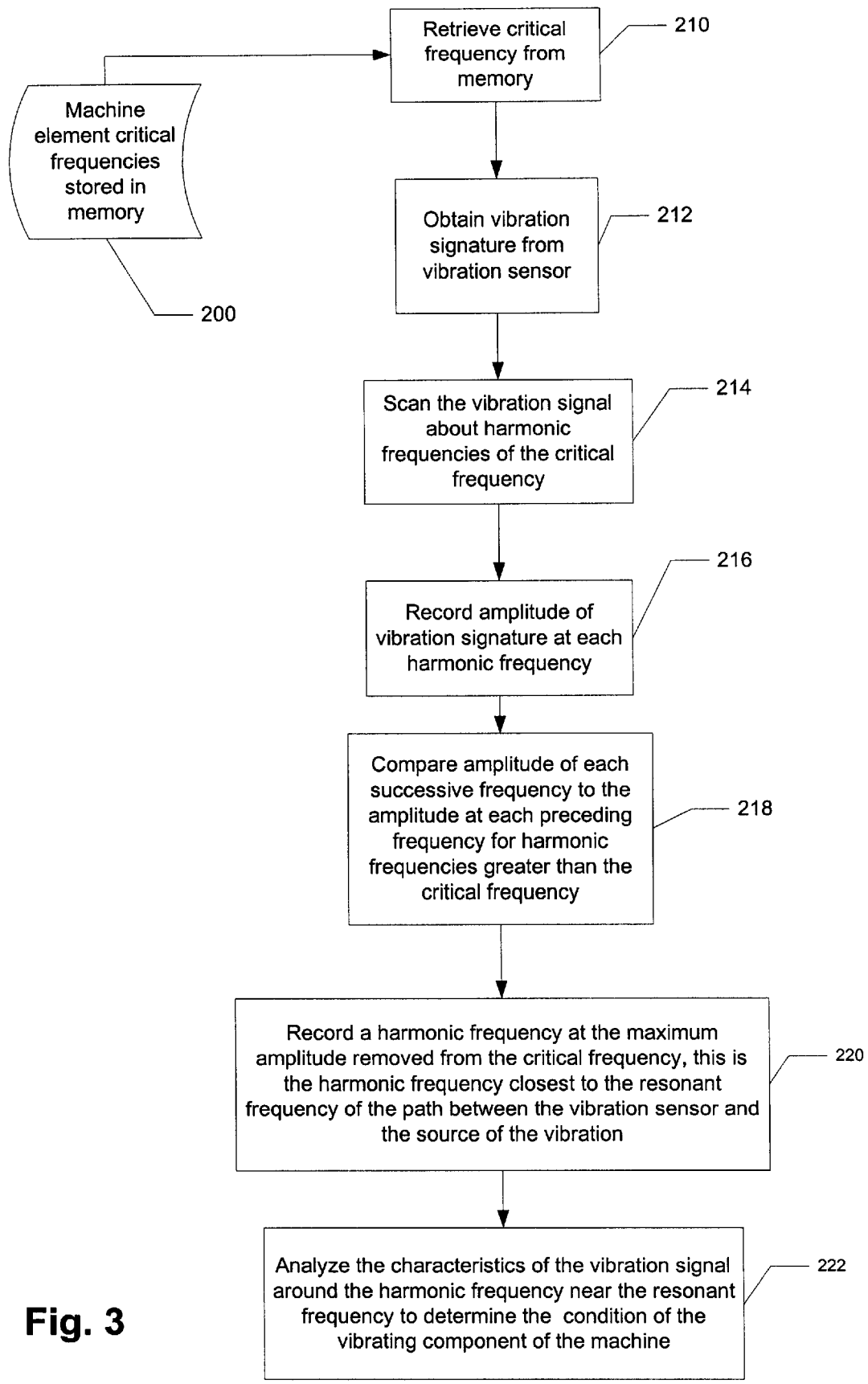
FIG. 3 is a flowchart illustrating a method for carrying out the present invention.

Referring now to FIGS. 2 and 3, in the vibration spectrum 120 from the FFT operator 118 generally there is a substantial amount of noise around the frequency of interest. The source of vibration, such as a bearing, produces vibrations in at least one frequency of interest, such as a bearing critical frequency. The frequency of interest may be supplied by the manufacturer of the part which is the source of vibrations, and this frequency may be entered into the memory 67 of the diagnostic module 44 using the keypad 60 of the display 50. Storage of the critical frequencies in memory is illustrated in step 200 of FIG. 3.

The amplitude is large near the frequency of interest but the signal is difficult to evaluate because there is a lot of noise around that frequency. Therefore, the processor 90 scans the vibration spectrum 120 around each harmonic of the frequency of interest, preferably up to at least about 10,000 Hz, step 214. For each harmonic the processor 90 records the amplitude, in step 216, and then compares the recorded amplitudes in step 218.

For higher frequency harmonics of the frequency of interest, the amplitude generally decreases from the amplitude at the frequency of interest. The amplitude suddenly increases above the noise, however, at or near the resonant frequency of one of the transmission paths from the vibration source to the vibration sensor 80 or 81. The health of a particular component thus can be analyzed by considering the shape and magnitude of the vibration signals about the sampled frequency in step 222.

It is to be appreciated that this particular example relates to a 2 Hp motor, and that the frequencies of interest will vary in accordance with the motor size and running speed.

In a way the vibration source replaces the calibrated hammer blows. Thus the invention replaces the calibrated hammer with electronic devices and software which greatly facilitate the vibration analysis and may improve its accuracy.

In addition, since the sensors 80 and 81 are permanently mounted, the resonant frequency of the path from the sensors 80 or 81 to the source of vibration, such as the bearings, does not change significantly over time. Thus the motor diagnostic module 36 can store in memory 67 the resonant frequencies for various transmission paths to particular sources of vibration for future analysis. The determination of resonant frequencies from the sensors 80 and 81 to various vibration sources in the motor 30 may be done before the motor 30 leaves the factory. Once the resonant frequency has been stored in the memory 67, the vibration analysis can be accomplished much more rapidly since the processor 90 does not have to scan all of the harmonic frequencies. The processor 90 can go directly to the harmonic frequency near the resonant frequency.

Alternatively, if the frequency of interest is unknown, such as the bearing frequencies in a previously installed motor, a calibrated hammer (not shown) is used in a conventional manner to strike the motor adjacent a vibration source while the motor 30 is idle. From the frequency response measured by the vibration sensors 80 and 81, the motor diagnostic module 36 calculates the approximate resonant frequency of the physical path between the impact point of the calibrated hammer and the vibration sensors 80 and 81 in a conventional manner. Although not very precise, this approach narrows the frequency region that the motor diagnostic module 36 must scan.

When the motor 30 is operating, the vibration sensors 80 and 81 measure the vibrations and the motor diagnostic module 36 scans the region about the approximate resonant frequency, recording amplitudes at a sequence of frequencies within that region and comparing the amplitudes at each frequency. Again, a sudden peak in amplitude indicates that a vibration source is generating vibrations, a harmonic of which is amplified about that frequency. In other words, at or near the frequency at which the amplified amplitude was measured there is a transmission path from the vibration source to the vibration sensor 80 or 81 that has a resonant frequency at the sampled frequency.

Returning to FIG. 1a, once the processor 90 has processed all of the respective motor data, the processed data may be sent to the host computer 66 for analysis. The host computer 66 may then make determinations as to the health of the motor 30 based on the data received from the diagnostic module 44. Accordingly, motor maintenance can be scheduled to correspond with the state of the motor 30. Additionally, the processed data can be compiled and stored for trend analysis and forecasting. Since the diagnostic module 44 is integrated with the motor 30, the data sampling rate can be substantially high thus providing accurate and up-to-date data relating to the health of the motor 30. However, as mentioned above, motor diagnosis, trend analysis, forecasting, etc. that could be performed by the host computer 66 alternatively may be performed directly by the diagnostic module 44.

The host computer 66 may utilize various analytical techniques such as those which generally fall under the category of conventional vibration analysis which have been proven to detect certain mechanical problems such as, for example, bearing failure, rotor problems, contamination from water or grit, holes in bearings, flat areas on bearings, broken or loose motor mounting, misalignment of motor shaft and load shaft, bent shafts, loose couplings, stator winding problems, fan problems, etc., as well as vibrations from other machine elements transmitted through the motor structure, such as gear mesh frequencies from a transmission connected between the motor 30 and the load 32.

Figure 4A:
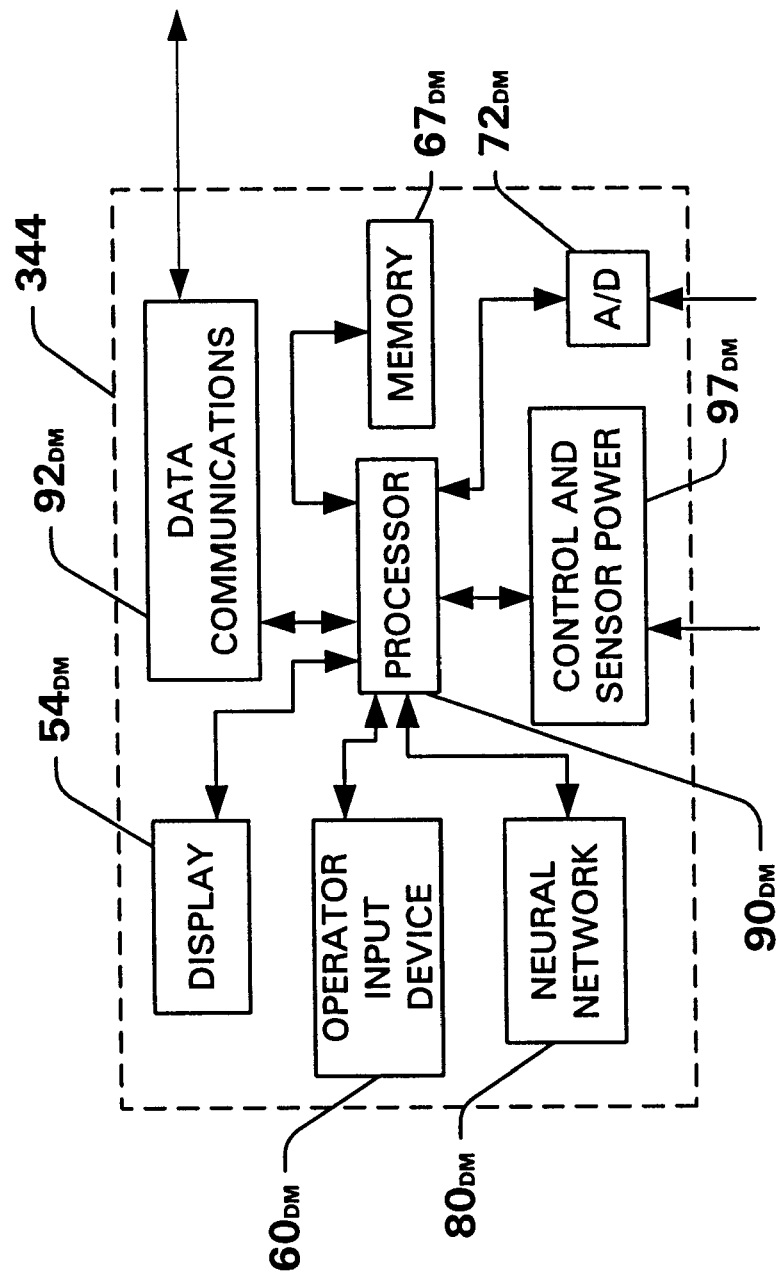
FIG. 4a is a functional schematic diagram of a diagnostic module including a operator interface device and employing a neural network in accordance with one aspect of the invention.
Figure 4B:
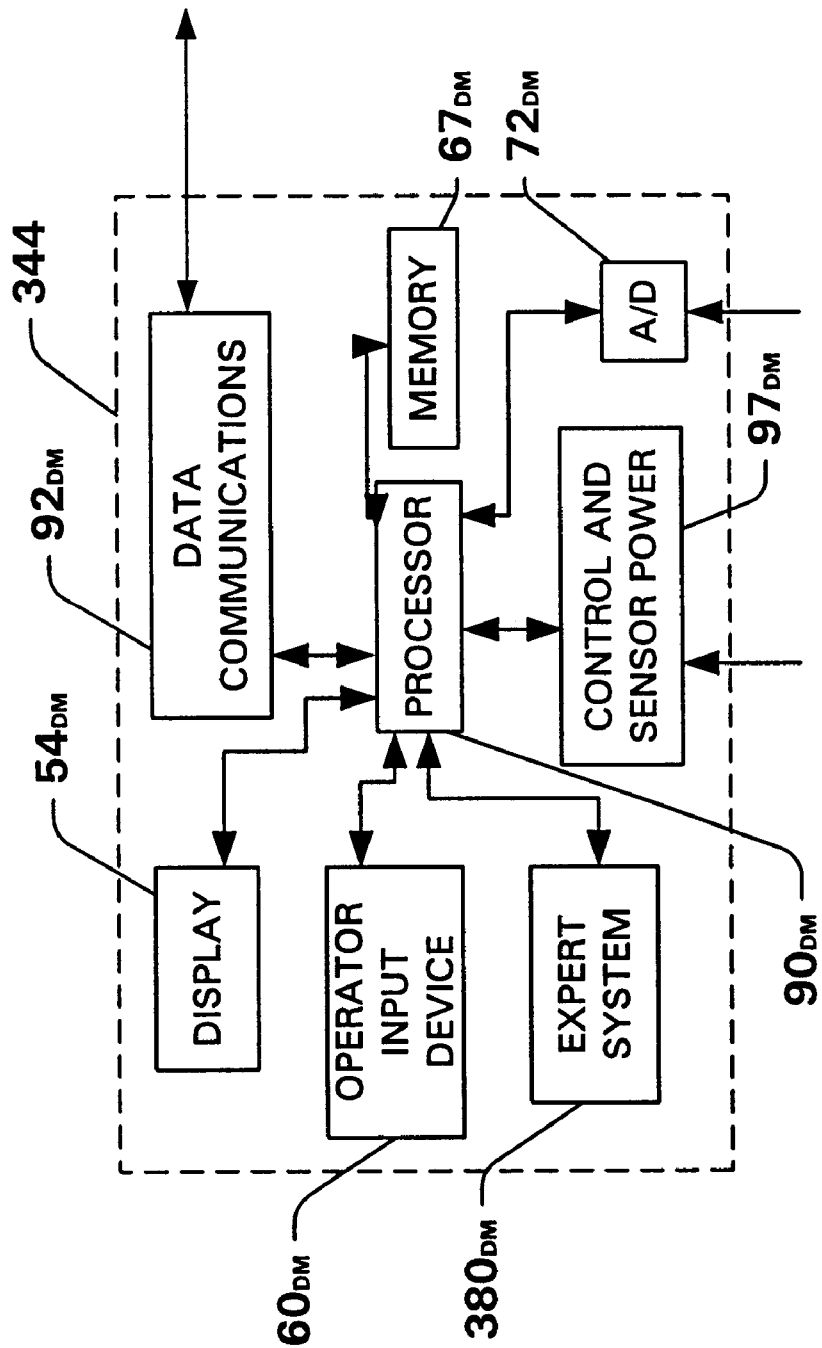
FIG. 4b is a functional schematic diagram of a diagnostic module including an operator interface device and employing an expert system in accordance with one aspect of the invention.

Turning now to FIG. 4a, another aspect of the invention is shown wherein the diagnostic module 344 functions to carry out the operations of the interface device 50 as well. The diagnostic module 344 includes essentially the same components as the diagnostic module 44 except that it also includes interface device 50 components as well. Accordingly, like parts between the diagnostic module 44 (FIG. 1a) and the interface device 50 (FIG. 1a) will share like reference numerals. However, the reference numerals of FIG. 4a for the diagnostic module 344 further include the subscript (DM) to designate that the component is associated with this particular embodiment. Further discussion as to the functions of the components is not repeated for sake of brevity and to avoid redundancy. However, in this embodiment, the diagnostic module 344 further includes a neural network $80_{DM}$ which is employed to facilitate data analysis and processing. The use of neural networks for motor diagnostics is well known in the art and thus further discussion relating thereto is omitted. Alternatively, the invention may employ an expert system $380_{DM}$ in lieu of or in addition to the neural network $80_{DM}$ as shown in FIG. 4b.

The programming or training of neural networks involves supplying the input and corresponding output data of samples containing features, similar to those being searched for. The neural network in turn learns by adjusting weights assigned to each of the neurons. The weights and threshold values of the neurons determine the propagation of data through the network and thus provides a desired output based on a respective set of inputs. Although neural networks are accurate, and can become more accurate over time, they are data driven and require a complete, representative, suite of sampled data for training. On the other hand, an expert system provides classification based on system information and expert information to derive more information about a subject and in turn to employ logical reasoning in making a decision.

Expert systems are typically knowledge-based rule-driven systems. An expert system is employed in accordance with the invention by establishing a hardware or software based program which receives input from a knowledge expert as to the nature of the items being sought for classification—in this case motor state. That is, during rule based generation, the expert system generates a rule or set of rules for each decision and stores given data into the knowledge base. The expert system in operation typically employs an "inference" engine to combine known facts and information to derive more knowledge about the subject.

For further information regarding the detailed structure and operation of an exemplary diagnostic module which can be used to carry out the invention, reference may be had to commonly owned and copending U.S. patent application Ser. No. 08/988,177 which is incorporated herein in its entirety.

Thus, the diagnostics module 44 is an integrated diagnostic device for determining the health of a machine. The integrated diagnostic module permits autonomous collection and processing of substantial amounts of data relevant to the health of a machine. Since the diagnostic module 44 is specific to a single machine, the vibration sensors 80 and 81 can be permanently mounted to the machine and connected to the diagnostic module 44 to improve data reliability. Furthermore, since the diagnostic module is machine specific the data can be sampled continuously or at accelerated intervals which allows for more reliable trend analysis and forecasting (e.g., maintenance scheduling and failure prediction). Additionally, the close proximity of the diagnostic module 44 to the sensors 80 and 81 collecting data permits the use of short sensor wire lengths which reduce opportunities for the introduction of noise through the sensor wires. Moreover, the invention allows autonomous determination of the health of a machine using very sophisticated diagnostic techniques, particularly vibration signature analysis based on software scanning for transmission path resonance rather than requiring the use of a calibrated hammer.

It is to be appreciated that the present invention may be employed to diagnose the health of a motor and/or vibrating component based on changes in resonant frequencies. For instance, by comparing a measured resonant frequency with an expected value—deviation between the two values may be used to diagnose an operating condition of the motor and/or component.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A diagnostic system for a dynamoelectric machine, comprising:
    at least one vibration sensor mounted on the machine to sense vibration; and
    a processor adapted to receive a vibration signal from the at least one vibration sensor, the processor scanning a vibration signature corresponding to the vibration signal over a series of frequencies to identify a resonant frequency for a transmission path from a vibration source to the at least one vibration sensor and to evaluate the vibration signature in the vicinity of the resonant frequency to determine an operating state of the machine.

2. The system of claim 1, wherein the processor is adapted to process the vibration signature using a fast fourier transform.

3. The system of claim 1 further including a diagnostic module to facilitate the vibration signature evaluation.

4. The system of claim 1, wherein the at least one vibration sensor is an accelerometer.

5. The system of claim 1, wherein the at least one vibration sensor is a proximity sensor.

6. The system of claim 1, further comprising at least one user interface device.

7. The system of claim 1, further comprising at least one sensor which senses at least a rotational speed of a component of the machine.

8. The system of claim 1, further including a memory operatively coupled to the processor, the memory storing design and/or diagnostic data relating to the machine.

9. The system of claim 8, the memory storing data relating to critical frequencies of at least one component of the machine.

10. The system of claim 8, the memory including historical vibration data relating to operating states of the machine, wherein the processor accesses this historical vibration data when analyzing the sensed vibration data to determine an operating state of the machine.

11. The system of claim 1 further including a neural network adapted to facilitate evaluation of the vibration signal.

12. The system of claim 1 further including an expert system adapted to facilitate evaluation of the vibration signal.

13. A method of analyzing a vibration signature of a dynamoelectric machine, comprising the steps of:
    obtaining the vibration signature from a vibration sensor connected to the machine;
    processing the vibration signature by determining an approximate resonant frequency of a vibration transmission path from a vibration source of the machine to the vibration sensor; and scanning a frequency region adjacent the approximate resonant frequency for harmonic frequencies of the vibration source of the machine having a relatively large amplitude; and
    determining a condition of the machine from characteristics of the vibration signal at the harmonic frequencies having a relatively large amplitude.

14. The method of claim 13, wherein the processing step further includes:
    determining at least one critical frequency of a vibration-generating component of the machine.

15. The method of claim 13 further including the step of identifying harmonic frequencies of the at least one critical frequency.

16. The method of claim 13 further including the step of recording amplitudes of the vibration signature at harmonic frequencies.

17. The method of claim 16 further including the step of comparing the recorded amplitudes to identify a resonant frequency associated with a sudden increase in amplitude.

18. A dynamoelectric machine diagnostic system, comprising:
    at least one vibration sensor mounted on a dynamoelectric machine to sense a vibration signature; and
    a processor adapted to receive the vibration signature from the at least one vibration sensor, the processor scanning the vibration signature over a series of harmonic frequencies of a critical frequency to identify a resonant frequency for a transmission path from a vibration source to the vibration sensor and evaluating the vibration signature in a frequency region near the resonant frequency to facilitate determining an operating condition of the machine.

19. The system of claim 18 wherein the processor is adapted to process the vibration signature using a fast fourier transform.

20. The system of claim 18, further including a diagnostic module to facilitate the vibration signature evaluation.

21. The system of claim 18, wherein the vibration sensor is an accelerometer.

22. The system of claim 18, wherein the vibration sensor is a proximity sensor.

23. The system of claim 18, further comprising at least one user interface device.

24. The system of claim 18, further comprising at least one sensor which senses at least a rotational speed of a component of the machine.

25. The system of claim 18, further including a memory operatively coupled to the processor, the memory storing design and/or diagnostic data relating to the machine.

26. The system of claim 25, the memory storing data relating to critical frequencies of at least one component of the machine.

27. The system of claim 25, the memory including historical vibration data relating to operating states of the machine, wherein the processor accesses this historical vibration data when analyzing the sensed vibration data to determine an operating state of the machine.

28. The system of claim 18 further including a neural network to facilitate evaluating the vibration signature.

29. The system of claim 18 further including an expert system to facilitate evaluating the vibration signature.

30. A dynamoelectric machine diagnostic system, comprising:
    means for sensing a vibration signature mounted on a dynamoelectric machine; and
    means for scanning the vibration signature over a series of frequencies to identify a resonant frequency for a transmission path from a vibration source to the means for sensing a vibration signature.

31. The system of claim 30 further including means for evaluating the vibration signature in the vicinity of the resonant frequency to determine the health of the machine.

32. A diagnostic system for a dynamoelectric machine, comprising:
    at least one vibration sensor mounted on the machine to sense vibration; and
    a processor adapted to receive a vibration signal from the vibration sensor and generate a vibration signature corresponding to the vibration signal, the processor scanning the vibration signature over a series of frequencies to identify a resonant frequency for a transmission path from a vibration source to the at least one vibration sensor and to evaluate the vibration signature in the vicinity of the resonant frequency, the processor comparing the identified resonant frequency with an expected resonant frequency in determining an operating condition of the machine.

* * * * *